United States Patent [19]

Saito

[11] Patent Number: 5,519,499
[45] Date of Patent: May 21, 1996

[54] IMAGE PROCESSING APPARATUS FOR STORING AND READING OUT IMAGE DATA

[75] Inventor: Hiroyuki Saito, Kanagawa, Japan

[73] Assignee: Fuji Xerox Co., Ltd., Tokyo, Japan

[21] Appl. No.: 45,297

[22] Filed: Apr. 12, 1993

[30] Foreign Application Priority Data

Apr. 13, 1992 [JP] Japan ................................. 4-092891

[51] Int. Cl.$^6$ ............................. H04N 1/21; H04N 1/00; H04N 1/40
[52] U.S. Cl. ..................... 358/296; 358/404; 358/444; 358/524
[58] Field of Search ...................... 358/524, 404, 358/444, 296; 395/115, 116–117; 355/202

[56] References Cited

U.S. PATENT DOCUMENTS 5,274,461  12/1993  Mitsuhashi ........................... 358/296
5,432,614   7/1995  Yamamoto ............................ 358/403

FOREIGN PATENT DOCUMENTS

2-81563  3/1990  Japan .

*Primary Examiner*—Peter S. Wong
*Assistant Examiner*—Randy W. Gibson
*Attorney, Agent, or Firm*—Finnegan, Henderson, Farabow, Garrett & Dunner

[57] ABSTRACT

Disclosed is an image processing apparatus such as a digital copying machine. The image processing apparatus has an image input unit for reading an image of an original, a compression unit for compressing the read image data, a temporary storage unit for temporarily storing the compressed image data, an accumulation unit for accumulating the image data stored in the temporary storage unit, a control unit for measuring the amount of the compressed data and for controlling the start of the process of reading next image data in accordance with a result of the measurement, an expansion unit for reading out image data which have been read out from the compression unit or the accumulation unit and stored in the temporary storage unit, and for expanding the readout image data, and an image output unit for forming an image on the basis of the expanded image data. The amount of compressed data of each of the pages of job 1 is measured, and, in accordance with the result, the process of reading the original of job 2 is performed during the copying process of second and subsequent copy sets of job 1.

12 Claims, 8 Drawing Sheets

IMAGE PROCESSING APPARATUS FOR STORING AND READING OUT IMAGE DATA

BACKGROUND OF THE INVENTION

This invention relates to an image processing apparatus such as a digital copying machine which forms an image on a recording sheet on the basis of image data obtained from image input means.

Conventionally, a digital copying machine is proposed in which image data are stored into storage means and a recording process is performed using image data read out from the storage means, so that the period required for obtaining a predetermined number of copy sets are shortened and the productivity is improved (Japanese Patent Unexamined Publication No. Hei. 2-81563).

Figure 11:
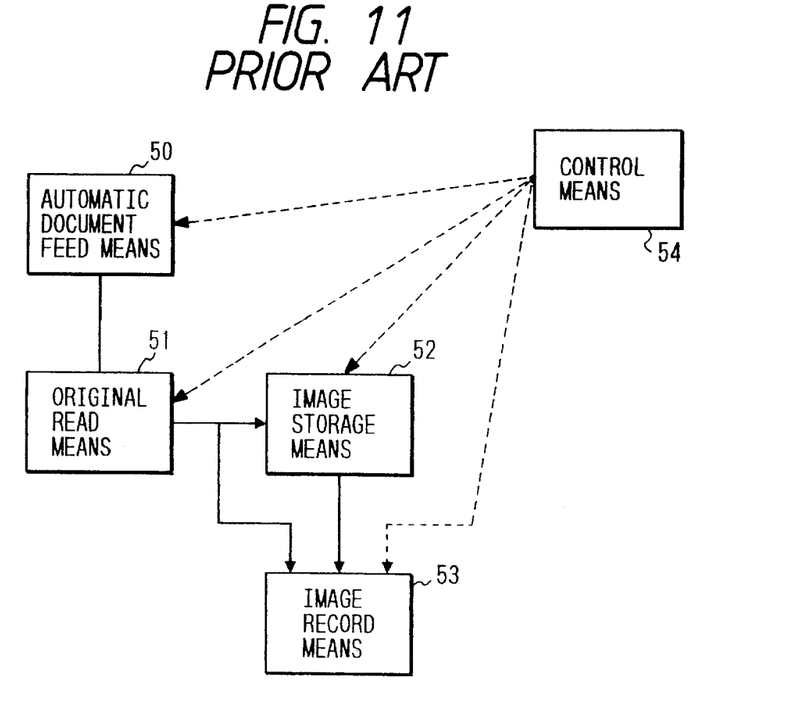
FIG. 11 is a block diagram illustrating a conventional image recording apparatus.

More specifically, as shown in FIG. 11, control means 54 controls the copying process as follows. Image data for a first copy set of an original fed by automatic document feed means 50 are sequentially read by original read means 51. The obtained image data are recorded by image record means 53, and simultaneously stored into image storage means 52. The process of recording second and subsequent copy sets is performed using image data read out from the image storage means 52. Since copy sets are obtained on the basis of stored image data in this way, the copying process can be performed at a high speed irrespective of the speed of reading image data from the original, thereby shortening the period required for obtaining a predetermined number of copy sets.

Such a conventional copying machine has the following problems:

(1) The use of a semiconductor memory as the image storage means allows random access to be quickly done. In the case that two or more copy sets of an original of job 1 are to be obtained, therefore, image data of an original of job 2 can be relatively easily read while performing a process of recording second and subsequent copy sets. When a semiconductor memory of a large capacity is used as the image storage means, however, the cost of the storage means is much higher than that of storage means composed of a storage device of another type.

(2) Although the use of an optical disk, a magnetic disk or a floppy disk as the image storage means reduces its cost, such a storage device operates slowly so that it is difficult to read image data of an original of job 2 while performing a process of recording second and subsequent copy sets of job 1. Therefore, image input means cannot perform the image input process and must remain in a wait status, until the output of second and subsequent copy sets of job 1 is completed.

SUMMARY OF THE INVENTION

The invention has been conducted in order to solve the above-mentioned problems.

It is an object of the invention to provide an image processing apparatus which can shorten the period starting at a process of reading image data from an original and continuing until a predetermined number of copy sets are obtained, thereby improving the productivity.

It is another object of the invention to provide an image processing apparatus which, even when a magnetic disk or the like is used as image storage means, can accept image data for a job without setting image input means to the wait status, while performing the copying process of another job.

It is a further object of the invention to provide an image processing apparatus which, even when a substantially long period is required for writing image data of a job, can accept the image data without setting image input means to the wait status, while performing the copying process of another job.

In order to solve the problems, the invention provides an image processing apparatus including: data input means for inputting image data; temporary storage means for temporarily storing the image data input through the data input means; accumulation means for accumulating and storing the image data stored in the temporary storage means; data process means for processing the image data accumulated in the accumulation means; first calculation means for calculating a period which is required for reading out image data to be processed from the accumulation means; and control means for, on the basis of a calculation result of the first calculation means, controlling at least one of the timing of reading out the image data from the accumulation means, the image data to be processed by the data process means, and the timing of storing the image data stored in the temporary storage means into the accumulation means.

DETAILED DESCRIPTION OF THE PREFERRED EMBODIMENT

Figure 1:
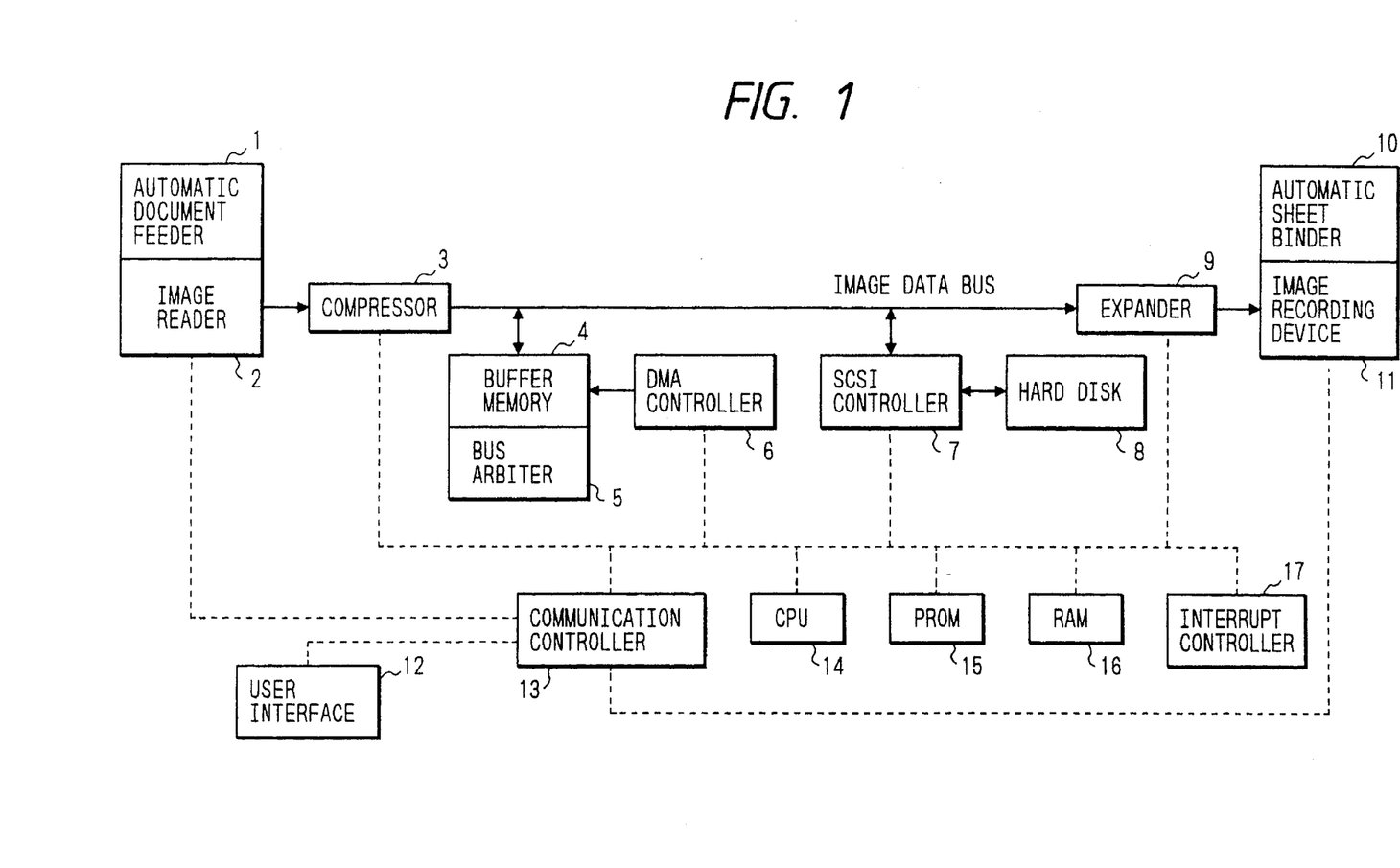
FIG. 1 is a block diagram showing the configuration of an embodiment of the image processing apparatus of the invention.

FIG. 1 is a block diagram showing the whole configuration of an embodiment of the image processing apparatus of the invention.

The image input means includes an automatic document feeder 1 and an image reader 2. The automatic document feeder 1 feeds originals in sequence to a predetermined reading position and ejects the originals which have been subjected to the reading process. The image reader 2 reads an image of an original by converting the image into electrical image data using an imaging device such as a CCD.

A compressor 3 compresses image data which have been read. This data compression contributes to the increase of the maximum number of pages of originals which can be stored in the form of image data in a hard disk 8, and allows the hard disk 8 to have a low data transfer rate.

Figure 2A:
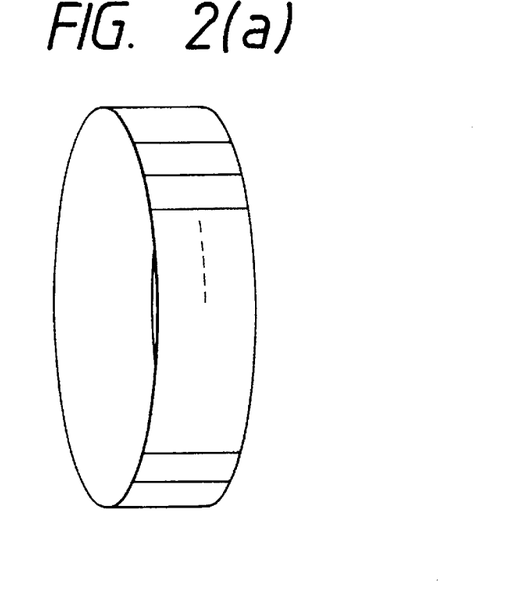
FIGS. 2(a) and 2(b) are diagrams illustrating the configuration of a buffer memory and the writing/reading operations.
Figure 2B:
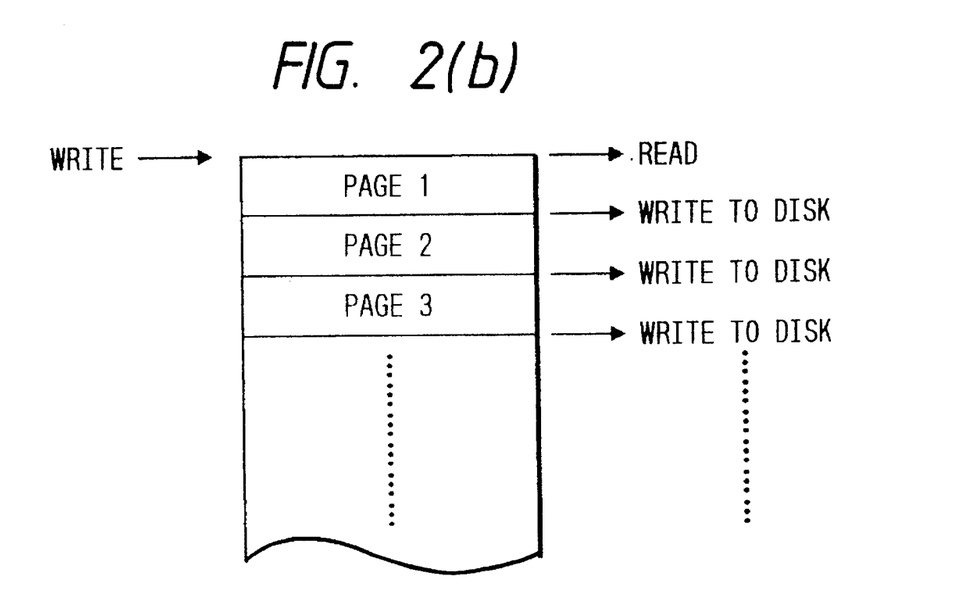

The data output rate of the compressor 3 is not constant, the hard disk 8 starts the data transfer after the elapse of a considerable period and the data transfer rate is not constant. Therefore, a buffer memory 4 is used as the means for temporarily storing data. As shown schematically in FIG. 2(a), the buffer memory 4 functions as a ring memory in which the end address is adjacent to the initial address. As shown in FIG. 2(b), when compressed data of one line are written, data are sequentially read out to an expander. When the writing region returns to the initial address, new data are written by substituting old data With the new data.

In the embodiment, the data accumulation means is the hard disk 8. As shown in FIG. 2(b), every time data of one page are written into the buffer memory 4, the writing of data in the unit of one page is performed on the hard disk 8.

An expander 9 reads out compressed image data of one line at a time which have been written to the buffer memory 4, expands the read out data, and outputs the expanded data. When image data of one line are written into the buffer memory, the expander 9 reads data, sequentially expands the data and outputs the expanded data to an image recording device 11.

The image output means includes the image recording device 11 and an automatic sheet binder 10. The image recording device 11 receives image data which have been expanded by the expander 9, and records an image on a sheet by a suitable recording method such as an electrophotographic recording method using a laser device. The automatic sheet binder 10 binds sheets of each copy set sequentially output from the image recording device 11.

A DMA controller 6 has three channels. Under arbitration of a bus arbiter 5, channel 1 performs the DMA transfer from the compressor 3 to the buffer memory 4, channel 2 performs the DMA transfer from the buffer memory 4 to the expander 9, and channel 3 performs the DMA transfer between the buffer memory 4 and a SCSI (Small Computer System Interface) controller 7.

The bus arbiter 5 arbitrates between DMA transfer requests from the three devices, the compressor 3, the SCSI controller 7 and the expander 9 to the buffer memory 4, in accordance with predetermined priorities and in the predetermined data unit. The bus arbiter 5 monitors the overflow of the buffer memory 4 which is used as a ring memory.

The SCSI controller 7 controls the hard disk 8 having a SCSI interface. The SCSI controller 7 is not a specially designed one, and may be almost any commercially available SCSI controller. On the basis of commands from a CPU 14, the SCSI controller 7 executes a SCSI protocol sequence to give interrupt requests to the CPU 14, thereby informing of the end of the sequence and a service request. The SCSI controller 7 supports the DMA transfer in which data are transferred at a high speed between the above-mentioned devices and the computer system.

In the above, a portion relating to the image data process has been described, this portion functions as a control system for causing the process to operate at a higher speed and is separated from a CPU bus.

The control means includes devices connected to the CPU bus of the control system.

The CPU 14 is the main control device which controls the devices connected to the CPU bus.

A PROM 15 stores software for operating the CPU 14.

A RAM 16 functions as a working memory for the CPU 14.

An interrupt controller 17 receives interruptions in accordance with predetermined priorities when the compressor 3, the SCSI controller 7, the expander 9 or a 3-channel communication controller 13 completes their process, and prompts the CPU 14 to perform the next process.

The communication controller 13 is a device for performing transfer of commands and status information between the CPU, the image input means, the image output means and a user interface 12.

The user interface 12 is a device which detects instructions from the operator and displays the status of the apparatus.

Figure 3:
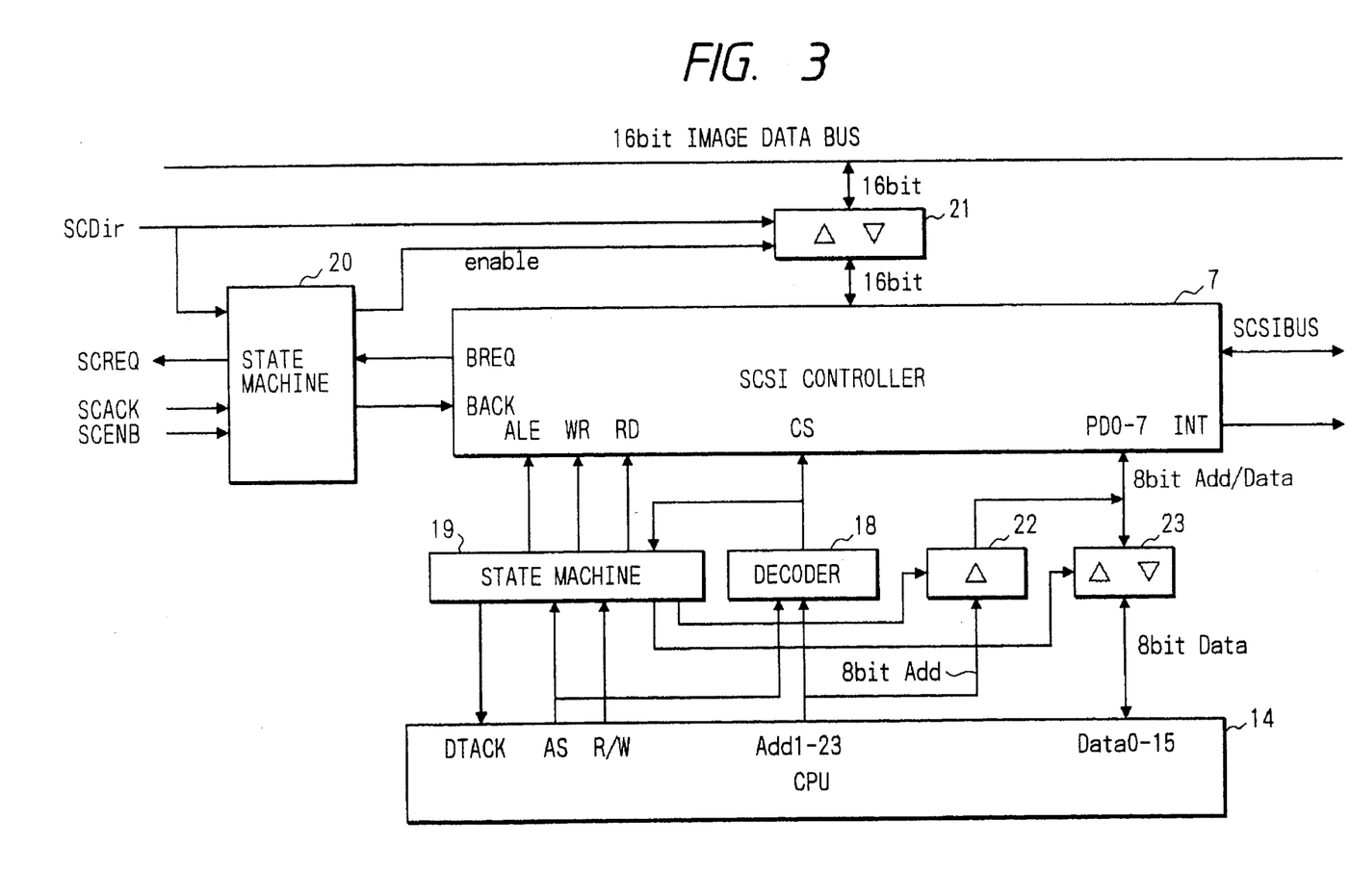
FIG. 3 is a block diagram illustrating a SCSI controller.

Referring to FIG. 3, the relationship between the CPU 14 and the SCSI controller 7 will be described in more detail.

The CPU 14 is a 16-bit CPU which has a 24-bit address space and a 16-bit data bus width. The SCSI controller 7 is provided with an 8-bit CPU bus and a 16-bit image data transfer bus which are separated from each other. A common bus type SCSI controller may be used, when the system is modified so that busses can be externally switched.

The SCSI controller 7 has an output BREQ for a signal requesting the DMA transfer, an input BACK for an acknowledge signal for that request, and an output INT for an interrupt signal to the CPU to interrupt. A decoder 18 and a state machine 19 generate control signals which are required when the CPU 14 accesses the SCSI controller 7. From a transfer direction signal SCDir which is output from an I/O port (not shown) set by the CPU 14, a signal BREQ, a DMA transfer acknowledge signal SCACK from the bus arbiter 5, and an effective signal SCENB for transferred data, a state machine 20 generates an enable signal for a buffer 21 connected between the image data bus and the SCSI controller 7, and at a predetermined timing a request signal SCREQ and the acknowledge signal BACK for the DMA transfer to the bus arbiter 5.

When the image data transfer between the buffer memory 4 and the hard disk 8 is to be done, the CPU 14 accesses the SCSI controller 7, and sets the operation mode, the data transfer length, etc. by designating a predetermined control register (not shown) incorporated in the SCSI controller 7, using an 8-bit address signal and through a buffer 22, thereby causing bus phases of the SCSI to be executed. The CPU 14 is informed of the completion of the execution by interruption. The CPU 14 generates a CDB (Command Description Block) for a disk, and accesses the SCSI controller 7 through a buffer 23 to transfer the CDB to the hard disk 8. The CDB includes operation codes for read and write, data transfer length (the number of selectors), sector address of the disk, etc. After the CDB is transferred, the data transfer is enabled.

Figure 4:
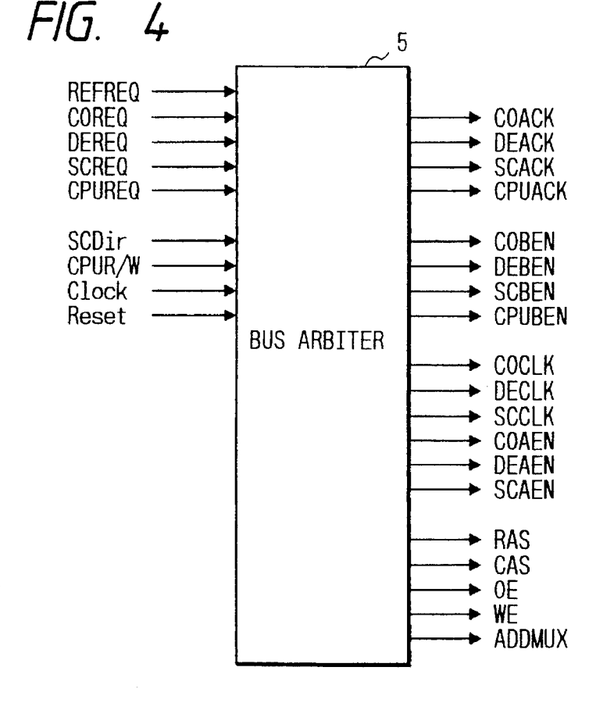
FIG. 4 is a diagram illustrating inputs and outputs of a bus arbiter.

FIG. 4 shows input and output signals of the bus arbiter.

As described above, the bus arbiter 5 arbitrates between requests issued by devices which access the buffer memory 4, in accordance with predetermined priorities, and permits one of the devices to use the image data bus.

In the embodiment, there are five devices which access the buffer memory 4, i.e., the compressor 3, the expander 9, the SCSI controller 7, a refresh controller (not shown) for the buffer memory 4 consisting of a DRAM, and the CPU 14. The access requests from these devices are REFREQ (refresh controller), COREQ (compressor), DEREQ (expander), SCREQ (SCSI controller), and CPUREQ (CPU). Although any line through which the CPU 14 can access the buffer memory 4 is not shown in FIG. 1, the CPU 14 may access the buffer memory 4 through a buffer. For example, the CPU 14 may generate a CDB on the buffer memory 4, and the CDB may be transferred to the SCSI controller. Alternatively, in order to perform a self-diagnosis or correct an error, the CPU 14 may sometimes read data from or write data to the buffer memory 4.

Priorities are established in the order of the refresh controller, the compressor 3, the expander 9, the SCSI controller 7, and the CPU 14. Since the devices perform the data transfer in accordance with one of the access modes (normal, nibble, and high speed page modes) of the DRAM, the bus arbiter 5 arbitrates between requests while using the access mode of each device as a unit. In addition to the above-mentioned five transfer request signals, the bus arbiter 5 receives further signals such as the transfer direction signal SCDir for the SCSI controller, a signal CPUR/W indicative of the read/write operation of the CPU, and signals Clock and Reset for generating predetermined timing signals.

From these input signals, the bus arbiter 5 generates following signals: four transfer acknowledge signals, COACK (compressor acknowledge signal), DEACK (expander acknowledge signal), SCACK (SCSI acknowledge signal), and CPUACK (CPU acknowledge signal); image data bus enable signals for the devices, COBEN, DEBEN, SCBEN, and CPUBEN; count clock signals for addresses generation in the three channels of the DMA controller, COCLK, DECLK, and SCCLK; effective signals for addresses generated by the three channels of the DMA controller, COAEN, DEAEN, and SCAEN; RAS (row signal) and CAS (column signal) signals for selecting addresses of the buffer memory (DRAM), OE (Output Enable) signal, and WE (Write Enable) signal; and ADDMUX signal for switching the RAS and CAS portions of addresses generated by the channels of the DMA controller.

Figure 5:
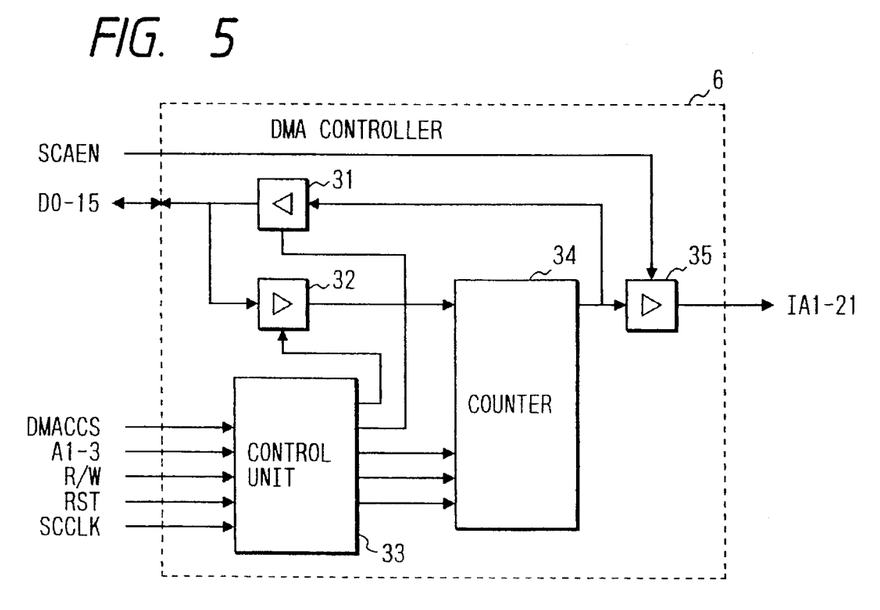
FIG. 5 is a block diagram illustrating a DMA controller.

FIG. 5 shows the configuration of one channel (for the SCSI controller) of the DMA controller.

This channel of the DMA controller includes a control unit 33 which operates in accordance with signals from the CPU and bus arbiter, buffers 31 and 32 which are controlled by the control unit 33, a counter 34 incorporating several registers, and a buffer 35 for gating a signal in accordance with the address effective signal SCAEN from the bus arbiter.

Data D0–D15 indicative of an address of the buffer memory 4 from which the write/read operation is to be started are input from the CPU 14, and set in the counter through the buffer 32. To the control unit 33, a chip select signal DMACCS, an address signal of 3 bits A1–A3, a signal R/W instructing whether data are to be set or read out are input from the CPU 14, and the clock signal SCCLK for address generation is input from the bus arbiter 5. RST is a reset signal which is generated when the power is turned on.

Before starting the DMA transfer, the CPU 14 sets the transfer start address of the buffer memory to the counter 34. At the same time when the DMA transfer is enabled by the bus arbiter 5, SCCLK is generated to be input to the DMA controller 6, so that the counter 34 counts up (or counts down) the address for accessing the buffer memory 4. The output of the counter 34 is fetched out in response to the address effective signal SCAEN from the bus arbiter 5 to be used as the address for the buffer memory 4. Data corresponding to the address are read out from the buffer memory 4 to the image data bus, or data on the image data bus are written at the address of the buffer memory 4.

In accordance with the image data bus enable signal SCBEN for the data transfer requesting device which has been acknowledged, the handshaking is done by SCREQ and SCACK, so that image data are transferred to the data transfer requesting device. The CPU 14 is informed of the completion of the DMA transfer by an interrupt request issued by a signal transfer requesting device. The CPU reads the address after the completion of the transfer to manage the address of the buffer memory.

Next, the operation of the apparatus will be described.

An original of job 1 which is set in the automatic document feeder 1 is fed to the predetermined reading position, and an image of the original is subjected to photoelectric conversion by the image reader 2 to be read as electrical image data. The read image data are compressed by the compressor 3 which in turn sends a transfer request to the bus arbiter 5. The CPU 14 previously sets the transfer start address to channel 1 of the DMA controller 6 which performs the DMA transfer between the compressor 3 and the buffer memory 4. As a result of the arbitration of the bus arbiter 5, the compressed image data are DMA-transferred to the buffer memory 4 to be written thereinto. When compressed image data of one or several lines (herein, the term "line" means one main scanning line of the image input means) have been written to the buffer memory 4, the reading of data to the expander 9 is enabled and image data are DMA-transferred to the expander 9 to be expanded therein. The expanded image data are output onto a sheet by the image recording device 11. The compressor 3 repeats these processes a number of times which equal to the number of pages of the original, whereby the copy of a first set is completed.

On the other hand, when compressed image data of one page have been accumulated in the buffer memory 4, the data are DMA-transferred by the SCSI controller 7 while one page is used as a unit, and written to the hard disk 7 through a SCSI bus. During the copying operation of the first copy set, this process is repeated a number of times which equal to the number of pages of the original.

Hereinafter, a method will be described in which the amount of compressed data of each page of the original of job 1 is measured, and the start of the process of reading the original of job 2 which is performed during the copying operation of second and subsequent copy sets of the original of job 1 is controlled depending on a result of the measurement.

When the compression of data of a first page is completed, the compressor 3 issues an interrupt request indicative of the page end. The CPU 14 receives this request and then reads the transfer end address of channel 1 of the DMA controller 6. From the transfer start address and the transfer end address, the CPU 14 calculates the amount of compressed data of the first page. The compressed image data of the next page are transferred using the address subsequent to the transfer end address for the first page as the transfer start address. The amount of compressed data of each of the succeeding pages is obtained in a similar manner.

Figure 6A:
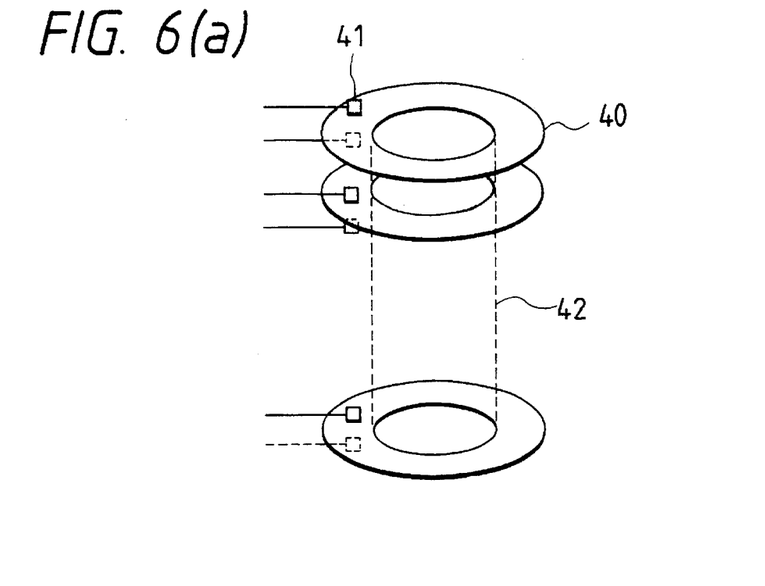
FIGS. 6(a) and 6(b) are diagrams illustrating the configuration of a hard disk.

The configuration of the hard disk 8 will be roughly described.

As shown in FIG. 6(a), the hard disk 8 includes one or more disks 40 in each of which both the sides function as a data face, and read/write heads 41 which are respectively provided for all the sides of the disks. The disks 40 rotate at a constant speed, and the heads 41 move radially. In the hard disk, addresses of data start from the outermost circle (track) of the disk corresponding to head 0, and then proceeds to the outermost track of the disk corresponding to head 1, and finally to the outermost track of the disk corresponding to head n. These n tracks constitute one cylinder. In the figure, a cylinder 42 of an arbitrary track is shown. When one cylinder has been completed, the addresses then move to the inner adjacent cylinder and return to head 0. In a similar manner, the addresses continue as far as the innermost cylinder. Every time one head completes a read/write operation for one track, the head is electrically switched to the next head. This switching operation requires a considerable period. When a cylinder is to be changed to the next cylinder, heads are moved by a distance corresponding to one cylinder (seek operation), simultaneously with the electrical switching of the heads. A period required for the seek operation corresponds to the cylinder switching time, and is longer than a usual switching time.

Compressed image data of the pages of the original of job 1 are written at continuous addresses of the hard disk 8. Therefore, the read time for each page can be roughly calculated by the following expression:

| | | |
|---|---|---|
| Write time | = | Read time |
| | = | SCSI protocol time |
| | + | Seek time to the cylinder including the designated sector address |
| | + | Rotation waiting time (maximum value) |
| | + | Amount of compressed data ÷ Rate of transfer to the media of the hard disk |
| | + | Switching time of the heads × Number of switchings |
| | + | Swithcing time of the cylinders × Number of switchings |

A specific example of the calculation will be described. The SCSI protocol time ends within about 1 msec. The specification of the hard disk 8 is listed in Table 1 below.

TABLE 1

| | |
|---|---|
| Storage Capacity | 120 Mbytes |
| Bytes/Sector | 512 |
| Sectors/Track | 50 |
| Tracks/Cylinder | 4 |
| Rotational Speed | 3600 rpm |
| Access Time | |
| Min. | 4 |
| Ave. | 14 |
| Max. | 25 |
| Sector Skew | 12 Sectors |
| Cylinder Skew | 25 Sectors |

Figure 6B:
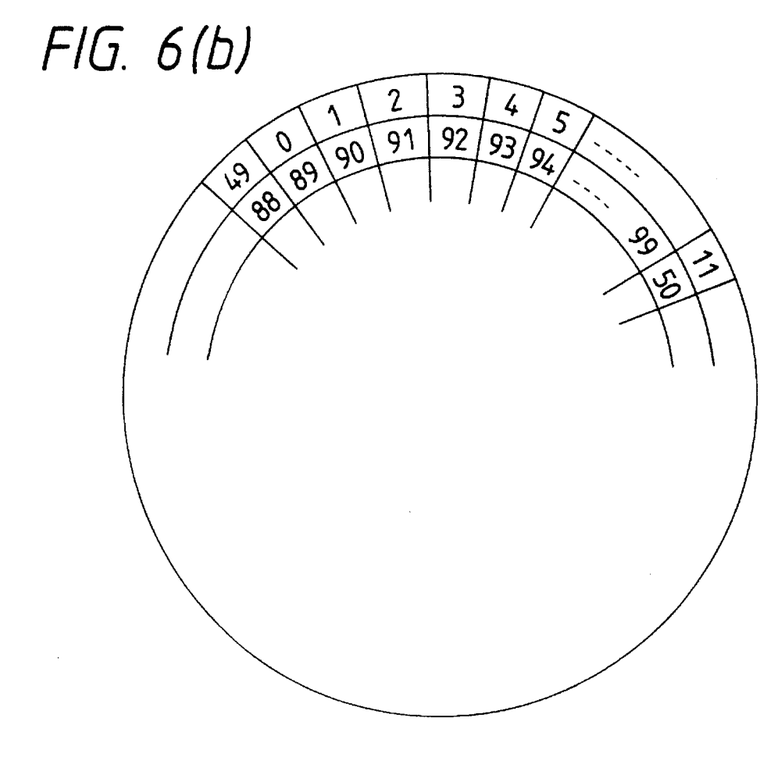

A sector is the basic block size used for accessing the hard disk 8, and 50 sectors are on each of the tracks. The sector skew is provided because the switching of the heads or the stabilization of the servo system requires time. From Table 1, there are 50 sectors per track and the size of the sector skew is 12 sectors. As shown in FIG. 6(b), therefore, the current sector is switched from sector 49 that is the last sector of track No. 0, to sector 50 which is the initial sector of track No. 1 and positionally shifted by 12 sectors from sector 49. Sector 50 is the next address. Since the movement over one cylinder requires time, the size of the cylinder skew is 25 sectors.

Figure 7:
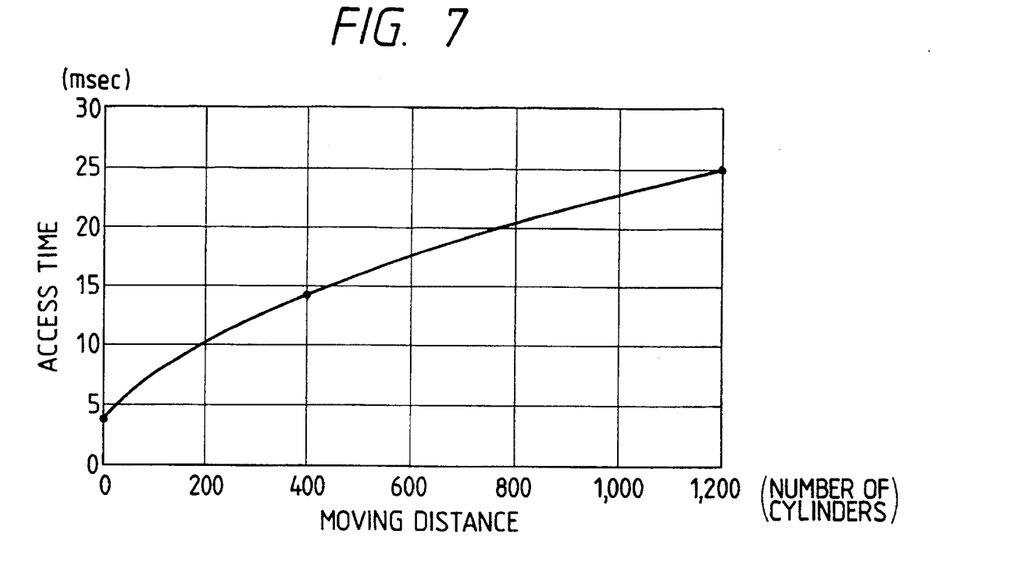
FIG. 7 is a graph illustrating the access time of the hard disk.

The minimum value of the access time shown in Table 1 is obtained when the moving distance of the heads corresponds to one cylinder, and is substantially equivalent to the cylinder skew. The average value of the access time is the mean of values obtained when the heads are moved by a distance corresponding to cylinders the number of which is one third of the total cylinder number. The maximum value is obtained when the heads are moved by a distance corresponding to the total cylinder number. These values are roughly known by a curve approximation shown FIG. 7 which is obtained when the number of cylinders is plotted as abscissa and the access time as ordinate. Alternatively, the CPU may not actually calculate the seek time of the head for moving the cylinder including the designated sector address, and the graph of FIG. 7 may be provided in the form of a table stored in the PROM 15 or RAM 16.

The rotation waiting time is a period starting when the heads move to the objective cylinder and continuing until when the sector into which data are to be written is moved to the head position, and has the maximum value which corresponds to the time for one rotation of the disks or is obtained as follows:

$$\text{Rotation waiting time} = 60 \text{ sec} \div 3600 \text{ rpm}$$
$$= 16.7 \text{ msec}$$

The rate of transfer to the media of the hard disk can be calculated from the capacity of one track and the time for one rotation of the disks as follows:

$$\begin{aligned}\text{Rate of transfer to the media} &= \text{Capacity of one track} \div \text{Time for one rotation} \\ &= 50 \times 512 \div 16.7 \\ &= 1.5 \text{ Mbytes/sec}\end{aligned}$$

The switching time of the heads can be inversely calculated from the sector skew. As described above, the sector skew defined in the specification of the hard disk is accommodated by skewing the position from the last sector of a track to the initial sector of the next track which is the next address. The switching time of the heads is obtained by the following expression:

$$\begin{aligned}\text{Switching time of the heads} &= 16.7 \div 50 \times 12 \\ &= 4.00 \text{ msec}\end{aligned}$$

The switching time of the cylinders can be inversely calculated from the cylinder skew. The cylinder skew is accommodated by skewing the position from the last sector of a cylinder to the initial sector of the next cylinder which is the next address. The switching time of the cylinders is obtained by the following expression:

$$\begin{aligned}\text{Switching time of the cylinders} &= 16.7 \div 50 \times 25 \\ &= 8.33 \text{ msec}\end{aligned}$$

On the other hand, the speed of reading an image and outputting the image is 30 sheets per minute (30 CPM). Therefore, the process time for one sheet is 2 sec. The image reading density and the recording density are 400 dpi. In the case of an original of A4 size, the total number of pixels is about 15.5 Mpels. When one pixel is subjected to the A/D conversion in the image reader at a rate of 8 bit/pel, the total amount of data is about 15.5 Mbytes. When further subjected to a multivalue pseudo intermediate process or multivalue half-tone process, the bit number per pixel is reduced to 4 bit/pel so that the amount of data before compression is about 7.33 Mbytes. When an average text document is compressed to one tenth, the amount of the compressed image data is about 0.733 Mbytes. Next, the period required for reading out image data of 0.733 Mbytes from the hard disk 8 will be calculated. This calculation is done under the conditions that the seek time is considered later and that, for the sake of simplifying the calculation, the position of the sector on a track is arbitrarily selected. Therefore, decimals of the numbers of switching the cylinders and heads are rounded up as a whole number.

Time of reading data
　　from the media　　= Amount of compressed data ÷
　　　　　　　　　　　　Rate of transfer to the media of
　　　　　　　　　　　　the hard disk
　　　　　　　　　　= 0.8 Mbytes ÷ 1.53 Mbytes/sec
　　　　　　　　　　= 532 msec Number of switching
　　the cylinders　　= Amount of data ÷ Cylinder capacity
　　　　　　　　　　= 0.733 Mbytes ÷ (512 bytes × 25 × 4)
　　　　　　　　　　= 8

Number of switching
　　the heads　　　　= Amount of data ÷ Sector capacity −
　　　　　　　　　　　Number of switching the cylinder
　　　　　　　　　　= 0.733 Mbytes ÷ (512 bytes × 25) − 8
　　　　　　　　　　= 33

Read time　=　1 + 16.7 + 523 + 4.00 × 33 + 8.33 × 8
　　　　　=　739.34 msec

Then, it is assumed that, in job 1, the original contains 10 pages, the total amount of the compressed data is 8 Mbytes= 80 cylinders, and the writing begins at sector 0 of the outermost cylinder or cylinder 0, that the writing of job 2 begins at the sector immediately after it, and that the reading of job 1 and the writing of job 2 are alternatingly conducted. Therefore, the heads repeatedly perform the seek operation on about 80 cylinders. From FIG. 7, the seek operation requires about 7 msec. Even when considering variations, the seek operation can be completed within about 10 msec.

As described above, the image read and output process time for one sheet is 2 sec. When the compression rate is set to be about 1/10 also in job 2, the reading of job 1 and the writing of job 2 can be alternatingly conducted. That is, the reading of job 2 can be performed during the output of second and subsequent copy sets of job 1.

This will be described referring to the sequence flow shown in FIG. 8.

Figure 8:
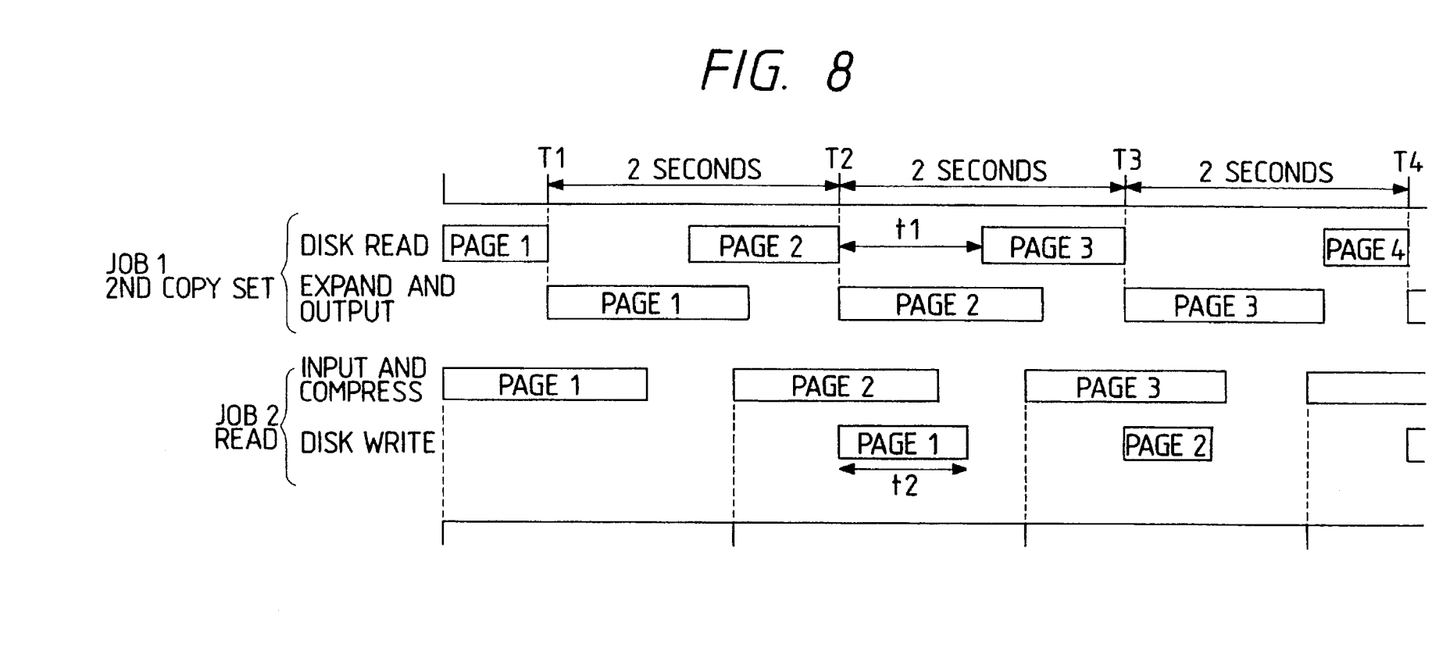
FIG. 8 is a diagram illustrating a sequence flow of obtaining second and subsequent copy sets.

The operations illustrated in FIG. 8 begin at the output of second and subsequent copy sets of job 1 and the start of the reading of job 2 which are performed after the output of the first set of job 1 and the writing to the hard disk 8 are completed.

The CPU has already known the data amount of each page of job 1 from the transfer start address and the transfer end address, and also an approximate period required for reading the data, as a result of calculations such as those described above. Therefore, with respect to times of starting the image output of the pages, times of starting the operations of reading the image data of the pages from the hard disk 8 can be scheduled. In the figure, T1, T2, T3, T4, . . . respectively indicate the times of starting the image output of the pages, and are arranged at intervals of 2 sec. The periods required for reading the pages vary depending on the compression rate, and the periods for the pages are already known. Accordingly, the times of reading the hard disk can be set so that the reading operations are completed at the times T1, T2, T3, T4, . . . , respectively.

For example, a period t1 which extends from the end of the process of reading the second page of job 1 from the hard disk 8 (time T2) to the start of the process of reading the third page constitutes an idle period of the hard disk. Hence, the first page of job 2 is read during this period.

More specifically, at the time when the first page of job 2 has been read and the compression is completed, the amount of data and the period required for writing the data to the hard disk 8 can be known. The period t2 of writing the first page of job 2 to which two seek times are added is compared with the period t1. When the period t2 is shorter than the period t1, therefore, it is possible to write the data to the hard disk 8.

Figure 9:
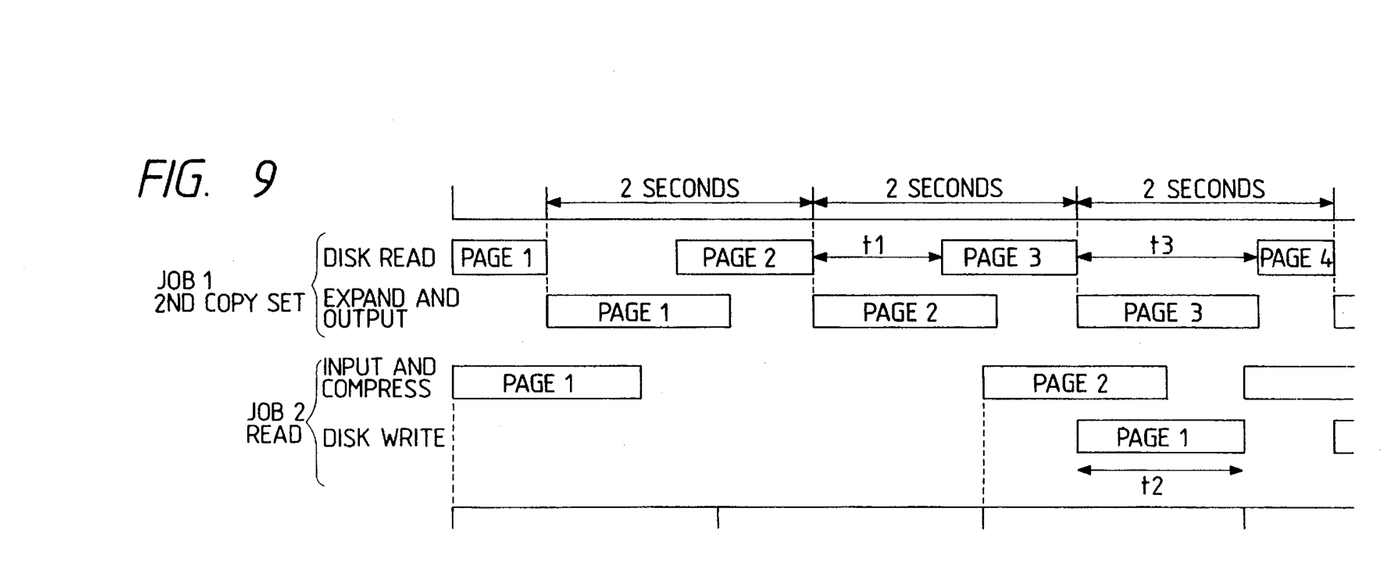
FIG. 9 is a diagram illustrating another sequence flow of obtaining second and subsequent copy sets.

When the period t2 is longer than the period t1, as shown in FIG. 9, it is impossible to write the data to the hard disk 8. Therefore, the period t2 is compared with the period t3 which is the next idle period and extends from the end of the process of reading the third page of job 1 from the hard disk 8 to the start of the process of reading the fourth page. When the period t2 is shorter than the period t3, it is possible to write the data to the hard disk 8.

Figure 10:
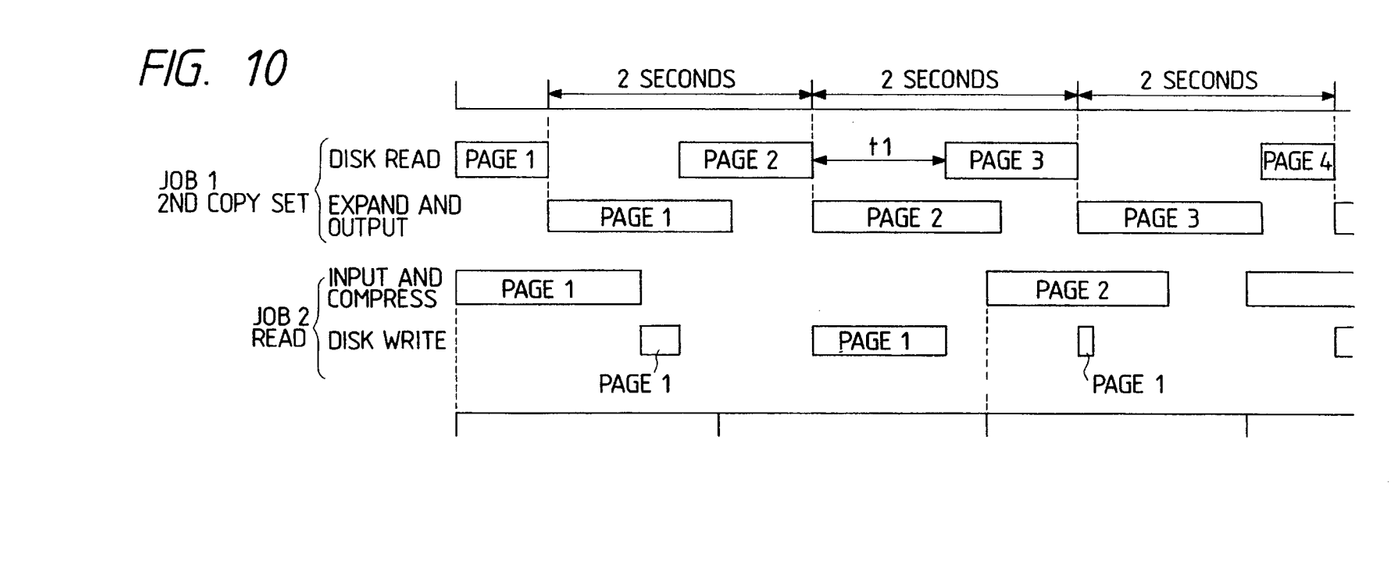
FIG. 10 is a diagram illustrating a further sequence flow of obtaining second and subsequent copy sets.

Alternatively, when the period t2 is longer than the period t1, the process of writing a page of job 2 to the hard disk 8 may be performed while dividing the page into plural portions as shown in FIG. 10. This allows the idle period of the access to the hard disk to be effectively used for the reading and writing of the original of job 2.

As seen from the above description, according to the invention, the amount of compressed data of the pages of the original of job 1 is measured, whereby the following effects can be attained.

(1) When the original of job 1 is compressed at a higher rate, the process of reading the original of job 2 and the process of writing the data to a disk can be performed during the output of second and subsequent copy sets of job 1.

(2) Immediately after the end of job 1, the output of job 2 can be performed so as to prevent the productivity from lowering.

What is claimed is:

1. An image processing apparatus comprising:

data input means for inputting image data;

temporary storage means for temporarily storing the image data input through said data input means;

accumulation means for accumulating and storing the image data stored in said temporary storage means;

data process means for processing the image data accumulated in said accumulation means;

first calculation means for calculating a period which is required for reading out image data from said accumulation means; and control means for, based on the period calculated by said first calculation means, controlling at least one of reading out the image data, to be processed by said data process means, from said accumulation means and storing the image data stored in said temporary storage means into said accumulation means.

2. The image processing apparatus according to claim 1, wherein said control means controls the timing of reading out the image data from said accumulation means on the basis of a scheduled time of starting the process of said image data process means and the calculated period of said first calculation means.

3. The image processing apparatus according to claim 1, further comprising compression means for compressing the image data input through said input means, wherein said temporary storage means temporarily stores the image data compressed by said compression means, and said first calculation means calculates the period which is required for reading out the image data to be processed from said accumulation means, from the amount of data compressed by said compression means.

4. The image processing apparatus according to claim 3, further comprising expansion means for expanding the image data compressed by said compression means, wherein said data process means forms an image on based on the image data expanded by said expansion means.

5. The image processing apparatus according to claim 3, wherein said first calculation means calculates an amount of image data from an initial address and end address of the image data stored in said temporary storage means, and calculates the period which is required for reading out the image data from said accumulation means, on the basis of the calculated amount of data.

6. The image processing apparatus according to claim 1, further comprising arbitration means for arbitrating between the reading of data from and the writing of data to said temporary storage means.

7. The image processing apparatus according to claim 1, wherein said accumulation means includes a hard disk.

8. The image processing apparatus according to claim 1, further comprising a data bus for transferring image data, and a control signal bus for transferring control signals for controlling said input means, temporary storage means, accumulation means and data process means.

9. The image processing apparatus according to claim 1, further comprising:

second calculation means for calculating a period during which said accumulation means is enabled, from the period which is calculated by said first calculation means and which is required for reading out the image data from said accumulation means, and a scheduled time of starting the process of said image data process means;

third calculation means for calculating a period which is required for accumulating the image data stored in said temporary storage means, in said accumulation means; and comparison means for comparing a calculation result of said second calculation means with a calculation result of said third calculation means.

10. The image processing apparatus according to claim 9, wherein, when in the comparison of said comparison means the calculation result of said second calculation means is greater than the calculation result of said third calculation means, said control means performs the control to write the image data stored in said temporary storage means, into said accumulation means.

11. The image processing apparatus according to claim 9, wherein, when in the comparison of said comparison means the calculation result of said third calculation means is greater than the calculation result of said second calculation means, said control means performs the control to divide the image data stored in said temporary storage means and store the divided image data to said accumulation means.

12. The image processing apparatus according to claim 11, wherein said image data written into said accumulation means are added with information indicative of a sequence of the division.

* * * * *

UNITED STATES PATENT AND TRADEMARK OFFICE
CERTIFICATE OF CORRECTION

PATENT NO.: 5,519,499

DATED: May 21, 1996

INVENTOR(S): Saito

It is certified that an error appears in the above-identified patent and that said Letters Patent is hereby corrected as shown below:

Claim 4, col. 11, line 7, delete "on" (first occurrence)

Signed and Sealed this

Seventeenth Day of December, 1996

Attest:

BRUCE LEHMAN

*Attesting Officer*         *Commissioner of Patents and Trademarks*